United States Patent
Brock et al.

(10) Patent No.: US 11,353,316 B1
(45) Date of Patent: Jun. 7, 2022

(54) INTERFEROMETRY WITH PIXELATED COLOR DISCRIMINATING ELEMENTS COMBINED WITH PIXELATED POLARIZATION MASKS

(71) Applicant: Onto Innovation Inc., Wilmington, MA (US)

(72) Inventors: Neal Brock, Tucson, AZ (US); James Millerd, Ticson, AZ (US); Erik Novak, Tucson, AZ (US); Brad Kimbrough, Tucson, AZ (US)

(73) Assignee: Onto Innovation Inc., Wilmington, MA (US)

(*) Notice: Subject to any disclaimer, the term of this patent is extended or adjusted under 35 U.S.C. 154(b) by 0 days.

(21) Appl. No.: 16/264,710

(22) Filed: Feb. 1, 2019

Related U.S. Application Data

(60) Provisional application No. 62/628,279, filed on Feb. 9, 2018.

(51) Int. Cl.
*G01B 9/02* (2022.01)
*G01B 9/02001* (2022.01)
*G01B 9/0209* (2022.01)

(52) U.S. Cl.
CPC ....... *G01B 9/0201* (2013.01); *G01B 9/02007* (2013.01); *G01B 9/0209* (2013.01); *G01B 9/02035* (2013.01); *G01B 9/02044* (2013.01)

(58) Field of Classification Search
CPC .............. G01B 9/0201; G01B 9/02007; G01B 9/02035; G01B 9/0209; G01B 9/02044
See application file for complete search history.

(56) References Cited

U.S. PATENT DOCUMENTS

| | | | |
|---|---|---|---|
| 9,880,377 B1* | 1/2018 | Safrani | G02B 21/0056 |
| 2011/0292402 A1* | 12/2011 | Awatsuji | G01B 9/021 |
| | | | 356/495 |
| 2012/0069320 A1* | 3/2012 | Simonov | G01C 3/08 |
| | | | 356/4.04 |
| 2012/0140235 A1* | 6/2012 | Lee | G01B 11/0675 |
| | | | 356/450 |

* cited by examiner

*Primary Examiner* — Hwa Andrew Lee
(74) *Attorney, Agent, or Firm* — Paradice and Li LLP

(57) ABSTRACT

A pixelated color mask is combined with a pixelated polarization mask in dynamic interferometry. The color mask includes a wavelength-selective bandpass filter placed in front of each camera pixel such that each set of contiguous four camera pixels is covered by two green bandpass filters, a red bandpass filter, and a blue bandpass filter. The pixelated phase mask is coupled to the color filters such that one polarization filter covers one set of color filters. At least three polarization filters are used to calculate phase. In addition, the color signals can be used, for example, to encode the motion of the interferometer, to provide very high speed autofocus or tip/tilt feedback, to create a color image of the object being measured, to automatically focus the system at different positions for different measurements conducted with different color sources, and to perform heterodyne interferometry with a single, vibration-immune measurement.

18 Claims, 7 Drawing Sheets

INTERFEROMETRY WITH PIXELATED COLOR DISCRIMINATING ELEMENTS COMBINED WITH PIXELATED POLARIZATION MASKS

RELATED APPLICATIONS

This application is based on and claims the priority of U.S. Provisional Application Ser. No. 62/628,279, filed on Feb. 9, 2018, hereby incorporated by reference in its entirety.

BACKGROUND OF THE INVENTION

Field of the Invention

The invention relates generally to surface metrology. More particularly, the invention relates to dynamic interferometric methods and apparatus implemented with the combination of a pixelated polarization mask with pixelated elements capable of either filtering or detecting multiple separate wavelengths.

Description of the Related Art

Pixelated polarization masks have been used for a number of years to enable various implementations of dynamic interferometry. With this technology, interferometric and fringe-projection measurements may be achieved by the acquisition of just a single camera frame, enabling vibration-immune metrology without sacrificing vertical resolution. See U.S. Pat. Nos. 6,304,330, 7,230,717, and 7,692,759, for example. Such systems have been employed to measure the shape of precision optics such as telescope mirrors, prisms, lenses, windows, and more, especially in environments where the use of mechanical means to eliminate vibration is impractical. Also, as described in co-owned U.S. Pat. No. 9,958,251, when combined with cycloidal waveplates, pixelated phase masks can be incorporated into fringe projection or structured light systems suitable for shop-floor measurements of precision machined surfaces to a micrometer level of resolution.

It is always useful and often also advantageous to provide as much information as possible to an end user about a surface under test. While system employing pixelated phase masks are quite powerful in terms of their ability to provide surface height information or transmitted wavefront information, that is essentially the limit of what can be provided with existing interferometric measurement systems because the number of detected variables is limited by the number of input signals received by the sensor. That in turn limits the information that can be gathered about other characteristics of the test object.

The present invention provides a solution to such need for augmenting the capability of interferometric systems based on the use of pixelated masks in so-called dynamic interferometry, as hereinafter defined.

SUMMARY OF THE INVENTION

This invention involves the use of pixelated color discriminating elements, as defined below, such as color-based filters or detectors with pixels capable of discriminating between different colors, in combination with a pixelated polarization mask, to provide further information about the sample and/or additional capability for metrology systems. In one embodiment, a pixelated color-filter mask comprises a wavelength-selective bandpass filter placed in front of each camera pixel. According to the preferred embodiment of the invention, the pixelated color-filter mask is a Bayer filter combined with the camera in such a way that each set of contiguous four camera pixels is covered by two green bandpass filters, a red bandpass filter, and a blue bandpass filter. The pixelated polarization mask is placed ahead of the color filters in such a way that each phase of the beams produced by the polarization mask is matched to one set of color filters; that is, in the case of the Bayer color filter, one polarization would impinge on each array of 2×2 color pixels. Alternatively, in reverse configuration, the pixelated color-filter mask may be placed on top of the polarization mask, followed by the camera along the optical axis of the instrument.

In another embodiment of the invention, rather than combining the pixelated phase mask with a color-filter mask, it is combined with a camera wherein each pixel consists of stacked photodiodes, each capable of detecting and separately measuring a different color or wavelength band. Thus, wavelengths in each phase of the beams produced by the pixelated phase mask are detected separately by the stacked diodes in each sensor pixel.

The combination of polarization filters with color discriminating elements affords many unique opportunities to obtain additional information about the sample. The light source can be broad-band, such that each of the color pixels receives a useful signal, or may consist of multiple sources of different wavelengths configured for multiple measurement goals. At least three polarization pixels are needed to calculate phase (and therefore any optical-path-difference-related quantity) but, in addition, the color signals can be used, for example, to encode the motion of the interferometer, to provide very high speed autofocus or tip/tilt feedback, to create a grey-scale or color image of the part being measured, to automatically focus the system at different positions for different measurements conducted with different color light sources, and to perform heterodyne interferometry with a single, vibration-immune measurement.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose only a few of the various ways in which the invention may be practiced.

DETAILED DESCRIPTION OF THE INVENTION

Figure 1:
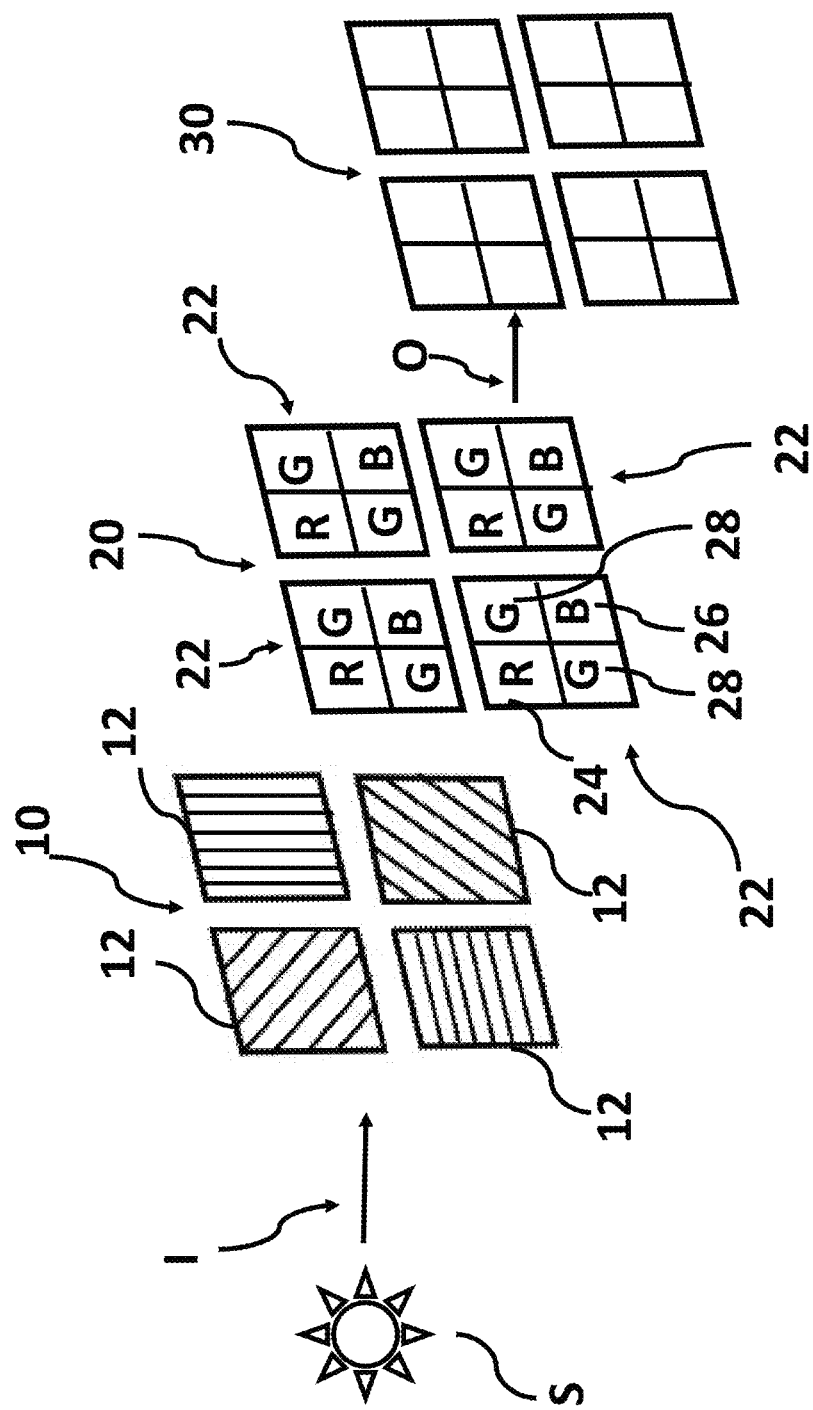
FIG. 1 shows a 2×2 pixelated phase mask (PPM) combined with a 4×(2×2) pixelated color-filter mask and a correspondingly pixelated detector to enhance the measurement flexibility of dynamic interferometry according to the invention.

For the purposes of this specification of the invention, as described and claimed, the term "orthogonal polarizer" is used to describe any optical device that produces an output of two orthogonally polarized beams. Such beams are preferably, but not necessarily, monochromatic. For instance, without limitation, cycloidal diffractive waveplates, birefringent prism pairs such as Wollaston, or interferometers like Twyman-Green with a polarizing beam-splitter, are hereby defined as orthogonal polarizers when configured to produce such output. The term "color-discriminating" is intended to mean the property of either filtering or sensing different colors propagated with a light beam. Accordingly, the term "pixelated color-discriminating element" is used herein to encompass both pixelated color-filter masks, wherein multiple sets of pixels are configured with each set to filter different colors, and detectors or other sensors wherein each pixel is capable of detecting and discriminating between multiple colors. The terms "pixelated phase mask" and "pixelated polarization mask" are used interchangeably to refer to a pixelated mask wherein multiple sets of pixels are each adapted to encode a high-frequency spatial interference pattern on two orthogonally polarized reference and test beams, each set including at least three pixels producing different phase shifts. Generally 4 pixels are used in a cell, with the $4^{th}$ pixel being another polarizer or containing no polarizing element and just allowing the light to impinge directly onto the detector. The terms "dynamic interferometry" and "dynamic interferometer" are defined and used to include any interferometric method and corresponding apparatus where at least three phase-shifted interferograms can be produced simultaneously from two orthogonally polarized beams. The term "dynamic imaging system" is used to refer to suitable optical elements used to image said at least three phase-shifted interferograms either on multiple cameras or on a single camera with different sets of pixels configured to detect respective interferograms. The term "phase-shifting mechanism" is used to refer to any device used in the illumination path to produce a temporal phase shift in the fringes resulting from the orthogonal polarizer used for the invention; without limitation, such a device could be mechanical, such as a linear or rotational actuator, or electronic, such as a liquid crystal or a solid-state switchable polarizer or retarder, or a rotating polarizer or retarder. The terms "fringes," "fringe pattern" and "interferogram" are used in conventional manner interchangeably in this description of the invention as referring to the intensity pattern produced by interfering light beams. Those skilled in the art understand that the term "single-frame" applies in particular to single-detector image acquisition and "single snap-shot" applies to simultaneous multiple-detector image acquisition. However, for convenience and simplicity of description, the terms "single-frame" and "single snap-shot" are also used interchangeably herein to refer generally to simultaneous data acquisition as applicable to the particular dynamic imaging system at hand, whether with a single detector or multiple detectors. As normally done in the art, it is understood that the term "detector" is used generically to refer to, and is intended to encompass, any device capable of sensing and quantitatively measuring an optical signal impinging on it, such as complementary metal-oxide-semiconductor (CMOS) and charge-coupled device (CCD) based cameras. Finally, with reference to pixelated phase masks, pixelated color-filter masks, and pixelated detectors, the terms "cell" and "pixel" are used interchangeably with the same conventional meaning; however, when used together to describe elements optically coupled to each other along a common optical axis of propagation, "cell" is used to refer to the larger element corresponding to a number of smaller "pixels." For example, a beam may be described as impinging on one cell of a pixelated phase mask followed by a same-size cell of a pixelated color-filter mask that contains four pixels of different color filters.

Based on the above definitions, the invention is based on the recognition that the utility of dynamic interferometry can be expanded to provide multiple items of additional information simply by combining, for example, the pixelated phase mask of a dynamic interferometric system with a correspondingly pixelated color-filter mask. As detailed in co-owned U.S. Pat. No. 7,230,717, a pixelated phase mask is subdivided into a plurality of sets of phase-mask pixels, such that each set produces a predetermined phase shift between orthogonally polarized test and reference beams. Thus, each set of phase-mask pixels provides a spatially separated fringe pattern on corresponding pixels of the detector. By providing at least three such sets of phase-mask pixels, each associated with a different phase shift, sufficient interferograms are produced to characterize a sample surface using conventional interferometric algorithms. For best results, the phase-mask pixels are preferably distributed uniformly throughout the phase-mask in unit sets such that each set is surrounded by adjacent sets with different phase shifts. Also, for best resolution, a one-to-one correspondence is preferably used between the phase-mask and the detector pixels.

As illustrated in FIG. 1, a conventional, exemplary pixelated phase mask 10 (which is the critical element of dynamic interferometry when optically coupled to a source of orthogonally polarized test and reference beams) is combined, according to the invention, with a pixelated color-filter mask 20 in such a way that each of the four phase-shifted beams produced by each cell 12 of the phase mask 10 impinges on a set of four different color-filter pixels of the color mask 20. As a result, the output from the color-filter mask 20 impinging on a correspondingly pixelated detector 30 comprises four phase-shifted beams for each color produced by the mask 20. For example, if each cell 22 of the color mask 20 includes three colors in Bayer filter configuration (i.e., one red bandpass filter 24, one blue bandpass filter 26, and two green bandpass filters 28), a broadband input wavefront I of orthogonally polarized beams received from a polarization interferometric source S will produce an output O of four phase-shifted beams for each of the three colors in each cell 22. Correspondingly, each pixel of the detector 30 will receive a signal related to a particular wavelength and phase shift from the combination of which different information can be obtained.

Figure 2:
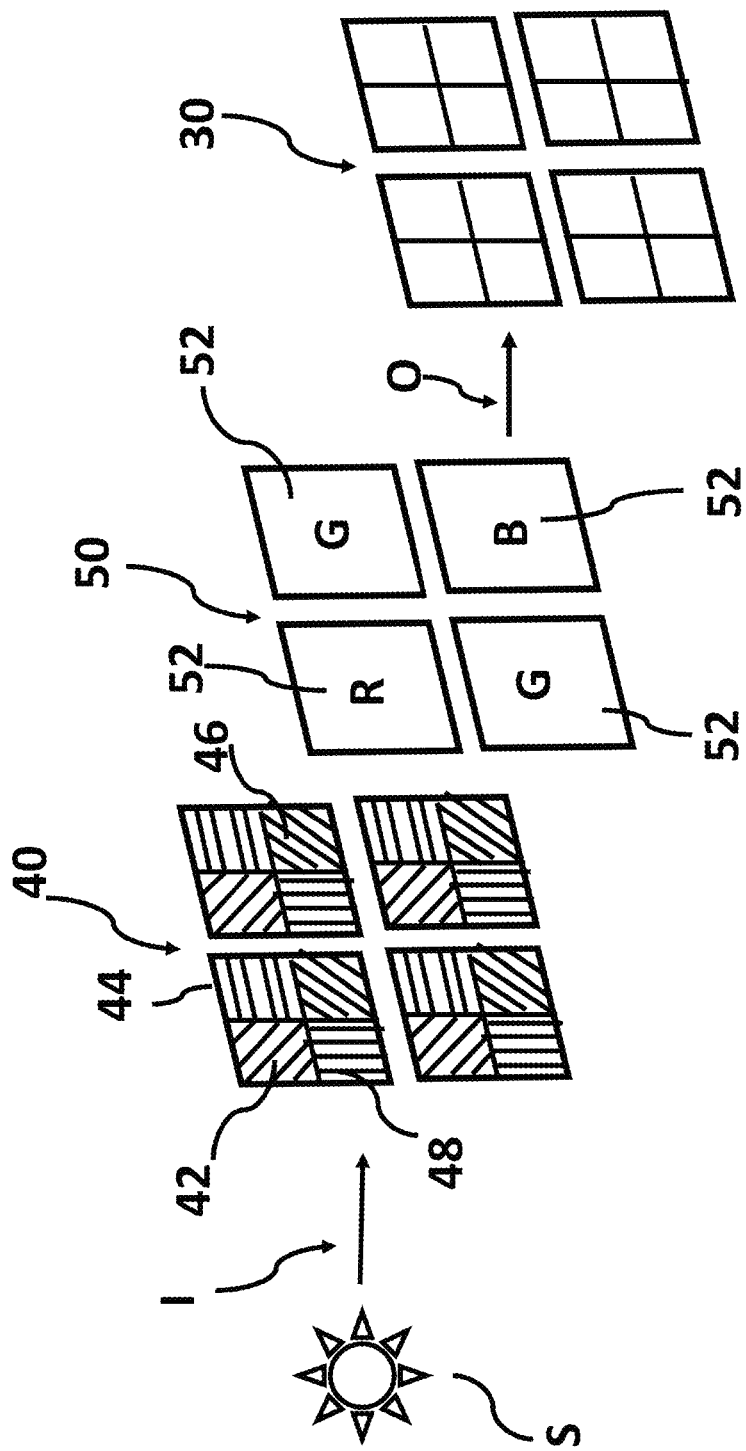
FIG. 2 shows an alternative embodiment of the invention wherein a 4×(2×2) pixelated phase mask (PPM) is combined with a 2×2 pixelated color-filter mask and the same pixelated detector.

One skilled in the art will readily recognize that the same effect can be achieved by reversing the configuration of the phase mask and color-filter mask, as illustrated in FIG. 2. That is, by having a four-cell pixelated phase mask 40, where each cell produces four phase-shifted beams in pixels 42,44,46,48, the output can then be combined with a four-cell pixelated color-filter mask 50 in such a way that each set of phase-shifted beams impinges on a different color pixel of the mask 50, and the same result is obtained. The result of such configuration is that the output O from each color cell 52 of the color-filter mask 50 impinging on a correspondingly pixelated detector 30 comprises four phase-shifted beams.

Figure 3:
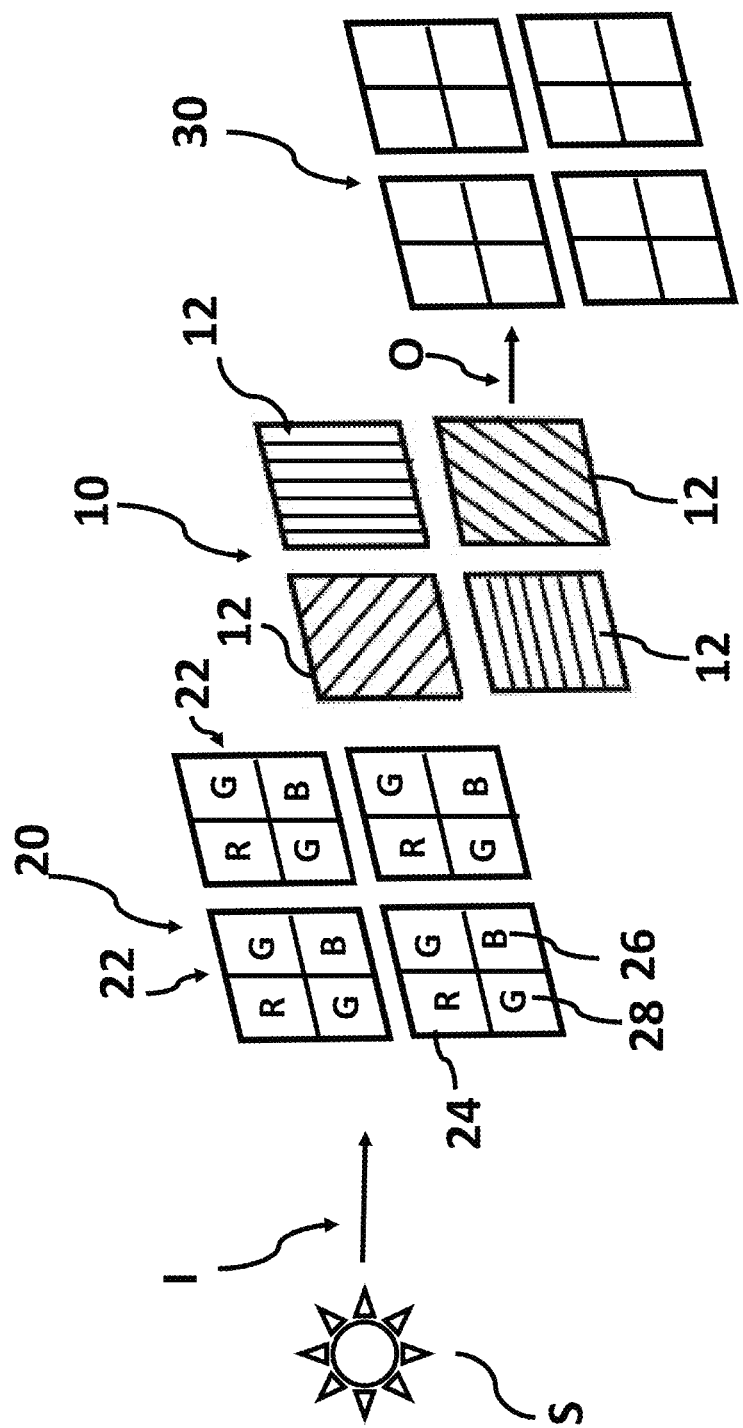
FIG. 3 illustrates an embodiment where the order of the pixelated phase mask and the color-filter mask of FIG. 1 is reversed along the optical axis of propagation of the light toward the detector.
Figure 4:
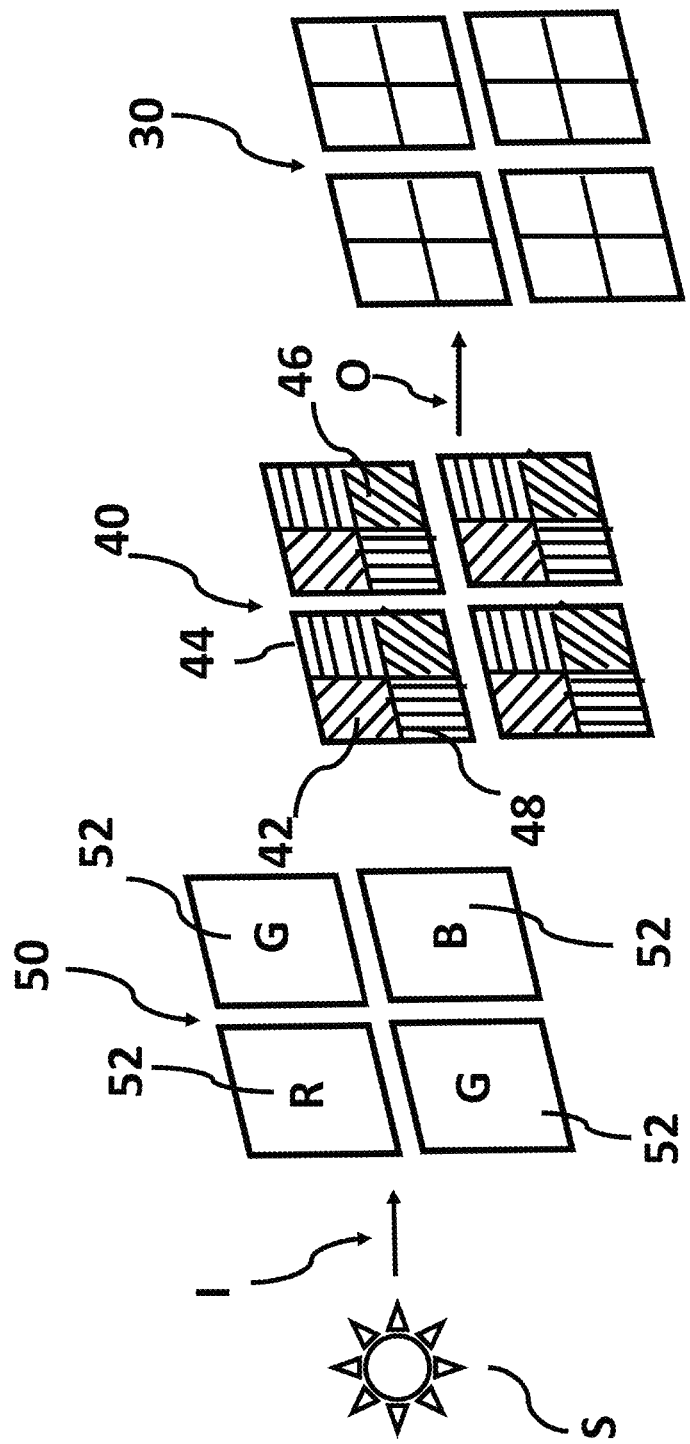
FIG. 4 is illustrates an embodiment where the order of the pixelated phase mask and the color-filter mask of FIG. 2 is reversed along the optical axis of propagation of the light toward the detector.

Similarly, as illustrated in FIGS. 3 and 4, one skilled in the art will readily recognize that the same effect can be achieved by reversing the order of the phase mask and the color-filter mask along the axis of propagation of the impinging orthogonally polarized beams I. In the configuration of FIG. 3, the light is first filtered in each cell 22 of the color-filter mask to produce four separate beams that are then phase shifted by corresponding cells 12 of the phase mask 10, each cell corresponding to a particular phase change (or no change in one of the cell's pixels, which may be advantageous for some applications). Similarly, in the configuration of FIG. 4 the light is first filtered by the color-filter mask 50 to produce four separate beams of different colors, one for each cell 52, each of which is then phase shifted by the corresponding four-pixel cells of the phase mask 40, each pixel corresponding to a phase change (or, again, no change in one of the cell's pixels—note that three phase shifts are required for interferometric measurements).

Figure 5:
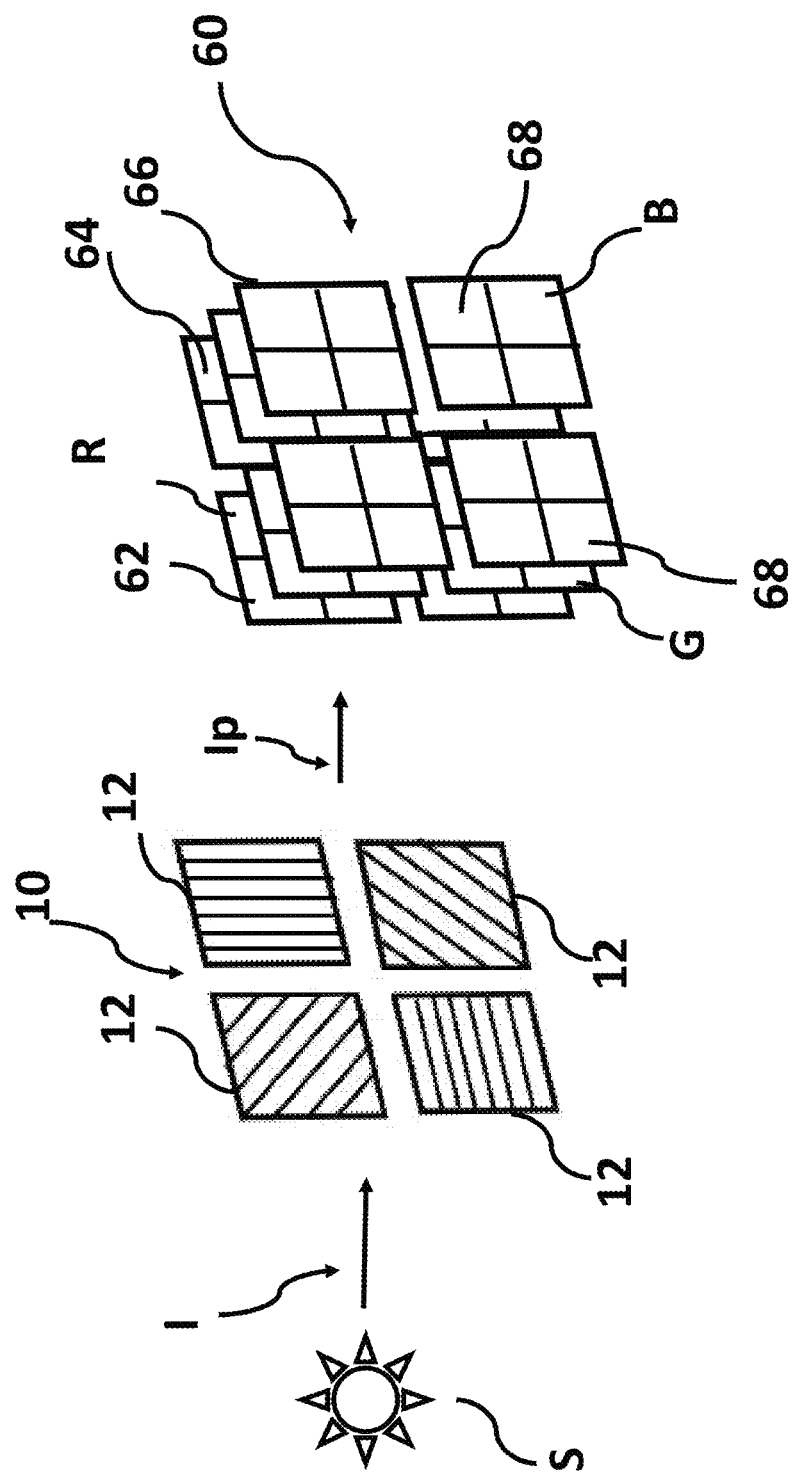
FIG. 5 is yet another embodiment wherein a pixelated phase mask in the configuration of FIG. 1 is combined with a sensor capable of detecting and measuring different colors in each sensor pixel by means of stacked photodiodes.

Inasmuch as the heart of the invention lies in the combination of a pixelated phase mask, as used in dynamic interferometry, with an element adapted to utilize different wavelengths (colors) to augment the signals produced by the combined beam of orthogonally polarized beams injected into the system, it is clear that any optical element capable of discriminating between the colors carried in a light beam can be used to practice the invention. Therefore, the same result and advantages can be achieved by combining a pixelated phase mask with a detector wherein each pixel has the capability of separately detecting and measuring different wavelengths. Such detectors are available commercially, for instance, from Dongbu Electronics under the name FOVEON X3 direct image sensor. As illustrated in FIG. 5, the phase mask 10 of FIG. 1, for instance, can be combined with such a detector 60 where stacked photodiodes 62,64,66 in each pixel 68 of the detector can sense and measure the phase-shifted light $I_P$ received within the red, green and blue colors, thereby enabling the same measurements achievable with the previous embodiments of the invention.

Figure 6:
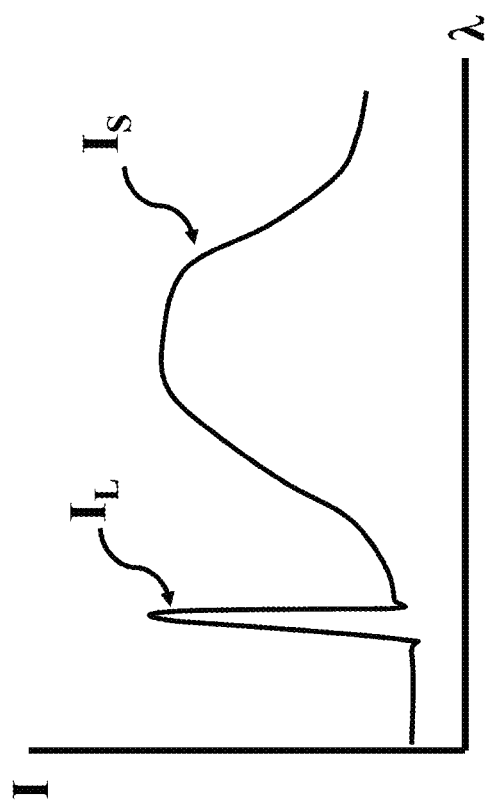
FIG. 6 illustrates a light spectrum with multiple bandwidths produced by a light source suitable to enhance the capability of the invention in any of its embodiments.

Those skilled in the art will also recognize that the invention could be practiced with a light source adapted to emit a spectrum particularly suitable for the application at hand. For example, a light source emitting a spectral band including both a long-coherence beam $I_L$ and a short-coherence beam $I_S$, as illustrated in FIG. 6, could be used with any of the embodiments disclosed herein to improve the utility of the pixelated color filter such as, for instance, where the bandwidth of the color filter is too wide to perform effectively a monochromatic application.

Therefore, it is understood that light sources suitable for the various embodiments of the invention can vary greatly. For example, a source that spans only one or more of the wavelength ranges of the color pixels (just blue, or blue and green, for instance) could be used as the source for performing single or dual-wavelength dynamic interferometry in a normal monochromatic interferometric set-up as if each color pixel array were its own sensor (i.e., in this example, just a blue-sensitive sensor, or a blue-sensitive sensor and a green sensitive sensor). The corresponding color pixels across at least three polarization pixels could be used to calculate phase (and therefore surface height, transmitted wavefront, chromatic aberration, or other optical-path-difference-related quantities). The remaining pixel could then be used to convey additional information. For example, a long-coherence source could be used to provide continuous fringes over long distances, such that the signal recovered from a continuous scan could be used to encode the motion of the interferometer very precisely. This would be useful when the interferometer is used in a short-coherence mode where the fringes are highly localized and, due to vibration or even just the geometry of the measured sample, fringes can be seen only over a portion of the field of view at a time. In such case, the long-coherence information on position obtained from the secondary long-coherence source could be used to stitch together multiple scan locations so that a full 3D picture from multiple exposures can be obtained, wherein each exposure only captured a limited scan range over a portion of the field of view. Thus, this information could be combined advantageously with the phase information to measure surfaces across multiple heights, as taught in U.S. Pat. Nos. 6,624,893 and 6,624,894. The advantage here, in addition to the added information provided by the invention, would result from the single camera frame, vibration-immune measurement performed at each height. Additionally, a long coherence signal could provide both, phase information at each surface height and scan information between surfaces at each pixel, while the white short-coherence color signals could be used not for phase measurement but for fringe counting or for finding focus between surfaces at each pixel.

According to another configuration that can be implemented in various manners according to the principles described above, a broad-band source and three or more of the polarization pixels can be used to produce the optical-path-difference-related signals needed to measure the surface of the part being tested. The color pixels can be used separately to create a color image of the part. Note that the phase-shifted signals are also available for imaging; therefore, the corresponding pixels could be used both for interferometry and for color scene reconstruction. By overlaying the true-color image onto the surface image, a realistic 3-D representation of the measured object can be displayed for a user. While a similar result has been achieved before (for example, Alicona Imaging's U.S. Pat. No. 9,161,014 uses a color camera and simple, non-interferometric, microscope imaging to create true color images; and Bruker Nano's U.S. Pat. No. 9,282,304 now offers a color camera option for its vertical scanning systems), the advantage here is that no scanning is required to produce the phase/height map, so all information can be acquired with a single snap-shot in a vibration-immune environment. However, if scanning is added, the measurement of surfaces at multiple different focus positions and the production of extended color images can be also achieved. While two adjacent pixels of the same color, but out of phase, can provide an intensity value for a given color, sometimes it may be convenient to capture two out-of-phase frames (average for all colors) and average them to get intensity values for each color, which are then used to obtain a color image. It is also understood that just a grey-level image can be created from any single color pixel, or, if one of the phase-mask pixels does not contain a polarizer, then the intensity image can be produced directly on the display screen in addition to the fringe image.

In another embodiment, using again a light source that spans one or more of the wavelength ranges of the color pixels (again, for example, just blue, or blue and green) in a standard dynamic interferometric arrangement, at least three polarization pixels can be used to calculate phase (and therefore surface height, transmitted wavefront, or other optical-path-difference-related quantities) and the remaining color pixel(s), such as available from a white LED source, would be available separately to encode additional information. For instance, such other color channel(s) could provide very high speed autofocus, or tip/tilt feedback, or both, independently of the interferometric information. This information could be very useful, for instance, for testing a lens design that is nicely corrected for the colors used for the interferometric arrangement but that produces an oval (astigmatic) spot for the other color(s) when defocused. That is, as would be understood by one skilled in the art, in optical design it is usually desirable to produce (and see, if operated manually) small spots when in focus with the wavelength used to perform the interference measurement and construct the surface shape. However, the lens system can be purposefully designed such that when red light is poorly focused, for instance, it produces a relatively large elliptical spot. This feature can thus be exploited as a precise focus detector. The optics could also be designed, as a further example, such that in the presence of tilt red light creates some skewed pattern; then, the red pixels only could be used advantageously to adjust tip/tilt, while and the blue and green pixels would remain available for interferometry. Similarly, the blue pixels could be used for interferometry, the green pixels for focus sensing, and the red pixels for tilt sensing, all of which is rendered possible by the combination of the pixelated phase and color elements of the invention.

With multiple color pixels available, it is also possible to design a system that is in focus at one sample-surface position for one color and in focus at another position for another color. This would be very useful, for instance, when measuring stepped features in the sample in a process control situation requiring tight control of the step height. Since both the top and bottom positions would be in focus (each for a respective color) when the sample is placed at the nominal proper height, stepped features could be measured and imaged accurately without scanning.

Finally, with three different color pixels it is also possible to combine multiple signals to do extended-range phase shifting interferometry (such as in heterodyne interferometry) in a single frame. In multi-wavelength interferometry multiple wavelengths are combined to obtain a longer effective wavelength according to the formula $\lambda_{eff}=\lambda 1*\lambda 2/(\lambda 1-\lambda 2)$. As one skilled in the art would readily recognize, even longer effective wavelengths can be achieved with three wavelengths by applying the formula to calculate both $\lambda_{eff}12$ and $\lambda_{eff}23$, and then combining them to obtain a final effective wavelength of $\lambda_{eff}123$. Thus, it would be possible to measure step heights, likely up to several tens of µm, with heterodyne precision with a single, vibration-immune, measurement.

Figure 7:
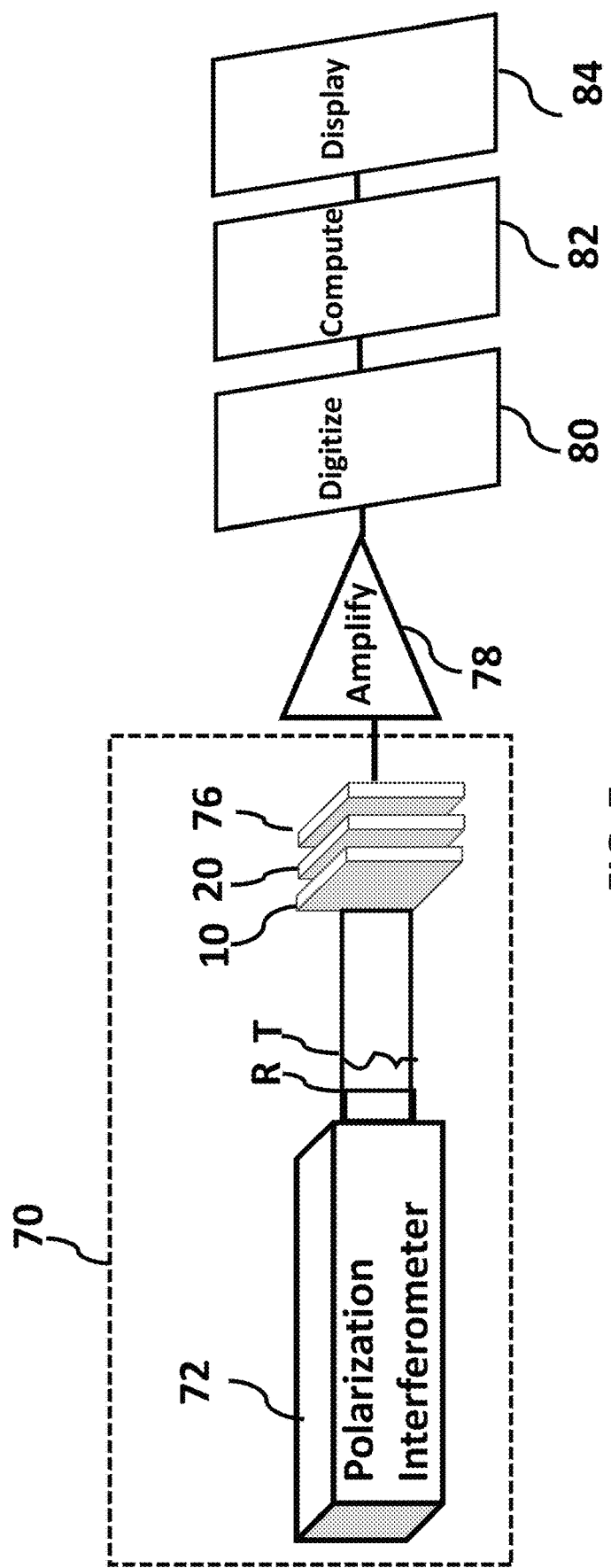
FIG. 7 is a schematic view of a measurement apparatus configured in accordance with the present invention.

FIG. 7 shows schematically a complete dynamic-interferometry measurement system 70 suitable to illustrate the invention. The system consists of a polarization interferometer 72 that generates a reference wavefront R and a test wavefront T having orthogonal polarization states (which can be linear as well as circular) with respect to each other; a pixelated phase mask 10 that introduces an effective phase-delay between the reference and test wavefronts at at least three sets of the mask pixels and subsequently interferes the transmitted light; a pixelated color-filter mask 20, according to the novelty of the invention, and a generic detector array 76 that receives the light transmitted by the mask 20 and converts the optical intensity sensed at each pixel to an electrical charge. The measurement system 70 will conventionally also include an amplifier 78 that converts the electrical charge to a voltage, a digitization circuit 80 that converts the voltage to a digital bit stream, a computer 82 that processes the digital bit stream to calculate optical phase difference and produce other information, and a display 84 that conveys the result in visible form and may permit user interaction in conventional manner Thus, a vibration insensitive system has been described for measuring objects with a single-frame approach that provides separate wavelength signals available for a variety of applications in addition to the interferometric measurement. The invention can be implemented with any dynamic interferometric systems known in the art, thereby augmenting their capability beyond the conventional measurement of OPD-related parameters.

The invention has been shown and described herein in what is believed to be the most practical and preferred embodiments. However, it is recognized that departures can be made therefrom within the scope of the invention. For instance, the optical configuration of the orthogonal polarizer may consist of the combination of circularly polarized light impinging on a polarizing beamsplitter in the microscopes objective or the body of the interferometer, such that a linearly polarized beam hits the reference surface and another hits the test surface, and they then go through another waveplate so that they can be interfered via the polarization mask of the invention. Also, while a Bayer filter is the most common filter used to achieve color imaging, other filters can be used for the invention, such as RGBC, CYYM, CYGM, etc. Similarly, the filter cell may contain more than 2×2 pixels. Finally, with reference to the various embodiments illustrated herein, it is noted that other configurations could be devised by those skilled in the art within the principles of the invention, which is the combination of a phase mask, as normally used in the various applications of the field of dynamic interferometry, with a pixelated color discriminating element, as it is defined herein. Therefore, the invention is not to be limited to the disclosed details but is to be accorded the full scope of the claims to embrace any and all equivalent apparatus and methods.

We claim:

1. An apparatus comprising:
    a polarization interferometer that generates a reference wavefront and a test wavefront having orthogonal polarization states;
    a pixelated phase mask that receives the reference wavefront and the test wavefront from the polarization interferometer, the pixelated phase mask including a plurality of phase cells, each phase cell including a plurality of pixels adapted to produce at least three different predetermined phase shifts between the reference wavefront and the test wavefront having orthogonal polarization states, thereby producing a corresponding plurality of phase shifted interferograms;
    a pixelated color-filter mask comprising a plurality of color filter pixels capable of discriminating a plurality of wavelengths, wherein one or more of the color filter pixels is aligned with one-to-one correspondence with one or more of the plurality of pixels in each phase cell and being adapted to provide spectral information for each of the plurality of phase shifted interferograms, and a pixelated detector in optical alignment with the pixelated color-filter mask, wherein one or more of pixels of the pixelated detector is aligned with one-to-one correspondence with one or more of the plurality of pixels in each phase cell of the pixelated phase mask and one or more of the color filter pixels; and a computer configured to characterize a test object based on the plurality of phase shifted interferograms with the spectral information.

2. The apparatus of claim 1, wherein the pixelated phase mask is ahead of the pixelated color-filter mask along an optical axis of the apparatus.

3. The apparatus of claim 1, wherein the pixelated color-filter mask is ahead of the pixelated phase mask along an optical axis of the apparatus.

4. The apparatus of claim 1, wherein the computer is configured to record continuous fringes generated by a long-coherence wavelength signal over a continuous scan and to encode a scanning motion of the apparatus over the continuous scan.

5. The apparatus of claim 1, wherein the computer is configured to record continuous fringes generated by a long-coherence wavelength signal over a continuous scan to measure a phase at a best-focus position and to encode a scanning motion of the apparatus over the continuous scan to determine a distance between measurements at different focus positions.

6. The apparatus of claim 1, wherein the computer is configured to produce an intensity image based on the spectral information.

7. The apparatus of claim 1, wherein the computer is configured to produce a color image of the test object based on the spectral information.

8. The apparatus of claim 7, wherein the computer is configured to overlay the color image onto a surface map obtained with the phase shifted interferograms to produce a 3-D representation of the test object.

9. The apparatus of claim 1, wherein the computer is configured to provide autofocus information based on the spectral information.

10. The apparatus of claim 1, wherein the computer is configured to provide tip/tilt information based on the spectral information.

11. The apparatus of claim 1, wherein the computer is configured to provide in-focus information at different scanning heights based on the spectral information.

12. The apparatus of claim 1, wherein the computer is configured to implement heterodyne interferometry using the spectral information.

13. The apparatus of claim 1, wherein the polarization interferometer comprises a light source that emits a spectrum including a short-coherence beam and a long-coherence beam.

14. The apparatus of claim 1, wherein each pixel within each phase cell of the pixelated phase mask is aligned with one-to-one correspondence with a set of four different color pixels in the pixelated color-filter mask.

15. The apparatus of claim 1, wherein each color filter pixel in the pixelated color-filter mask is aligned with one-to-one correspondence with a phase cell comprising a plurality of pixels adapted to produce the at least three different predetermined phase shifts in the pixelated phase mask.

16. An interferometric method comprising the steps of:
injecting a reference wavefront and a test wavefront having orthogonal polarization states from a polarization interferometer into a combination of a pixelated phase mask and a pixelated color-filter mask, the pixelated phase mask receives the reference wavefront and the test wavefront from the polarization interferometer, the pixelated phase mask including a plurality of phase cells, each phase cell including a plurality of pixels adapted to produce at least three different predetermined phase shifts between the reference wavefront and the test wavefront having orthogonal polarization states, thereby producing a corresponding plurality of phase shifted interferograms, and the pixelated color-filter mask comprising a plurality of color filter pixels capable of discriminating a plurality of wavelengths, wherein one or more of the color filter pixels is aligned with one-to-one correspondence with one or more of the plurality of pixels in each phase cell and being adapted to provide spectral information for each of the plurality of phase shifted interferograms, and a pixelated detector in optical alignment with the pixelated color-filter mask, wherein one or more of pixels of the pixelated detector is aligned with one-to-one correspondence with one or more of the plurality of pixels in each phase cell of the pixelated phase mask and one or more of the color filter pixels; and characterizing a test object based on the plurality of phase shifted interferograms with the spectral information.

17. The method of claim 16, wherein the pixelated phase mask is ahead of the pixelated color-filter mask along an optical axis of the polarization interferometer.

18. The method of claim 16, wherein the pixelated color-filter mask is ahead of the pixelated phase mask along an optical axis of the polarization interferometer.

\* \* \* \* \*